United States Patent
Vargas et al.

[11] Patent Number: 5,593,759
[45] Date of Patent: Jan. 14, 1997

[54] PRESSURE-SENSITIVE STRUCTURAL ADHESIVE

[75] Inventors: Richard R. Vargas, Southgate; Sebastian S. Plamthottam, Upland; John O. Landers, Duart, all of Calif.

[73] Assignee: Avery Dennison Corporation, Pasadena, Calif.

[21] Appl. No.: 227,193

[22] Filed: Apr. 13, 1994

Related U.S. Application Data

[63] Continuation of Ser. No. 963,674, Oct. 20, 1992, abandoned.

[51] Int. Cl.⁶ ........................................................ C09J 7/02
[52] U.S. Cl. ........................... 428/200; 428/344; 428/349; 428/354; 428/355
[58] Field of Search ................................ 428/354, 355, 428/200, 346, 347, 344, 343, 349

[56] References Cited

U.S. PATENT DOCUMENTS

| | | | |
|---|---|---|---|
| 3,312,754 | 4/1967 | Marks et al. | 525/57 |
| 3,326,741 | 6/1967 | Olson | 428/441 X |
| 3,639,500 | 2/1972 | Muny et al. | 526/938 X |
| 4,404,246 | 9/1983 | Charbonneau et al. | 428/355 X |
| 4,404,345 | 9/1983 | Janssen | 526/208 X |
| 4,452,955 | 6/1984 | Boeder | 524/541 X |
| 4,741,947 | 5/1988 | Pataki | 428/354 X |
| 4,812,541 | 3/1989 | Mallaya et al. | 526/264 |
| 4,880,683 | 11/1989 | Stow | 428/200 |
| 4,948,825 | 8/1990 | Sasaki | 428/355 X |

OTHER PUBLICATIONS

*Acryloid Thermoplastic Acrylic Ester Resins for Industrial Finishing*, (pp. 1, 8).

Primary Examiner—Jenna Davis
Attorney, Agent, or Firm—Christie, Parke & Hale, LLP

[57] ABSTRACT

A pressure-sensitive structural adhesive is formed by applying a thin layer of pressure-sensitive adhesive to one or both sides of a core layer of partially cured structural adhesive. The pressure-sensitive adhesive provides a tacky surface allowing a temporary bond at room temperature. Upon curing of the construction, the bond properties change to that of a structural adhesive, providing a strong permanent bond. Upon cure, the skin layer or layers of pressure-sensitive adhesive are absorbed into the layer of structural adhesive.

15 Claims, 1 Drawing Sheet

PRESSURE-SENSITIVE STRUCTURAL ADHESIVE

CROSS-REFERENCE TO RELATED APPLICATION

This is a continuation of application Ser. No. 07/963,674 filed Oct. 20, 1992 now abandoned.

FIELD OF INVENTION

This invention provides a novel pressure-sensitive structural adhesive construction which is normally tacky and forms a pressure-sensitive adhesive bond at room temperature, which bond on heat activation is supplanted by a structural adhesive bond.

BACKGROUND OF THE INVENTION structural adhesives such as cyanoacrylate epoxy resins and the like are well-known for providing strong and permanent bonds. However, before curing, such adhesives do not normally provide aggressive adhesive qualities and, therefore, require external aids such as clamping devices to hold the substrates to be bonded together until cure has been completed and a structural bond formed.

Tacky, pressure-sensitive adhesives have been known for many years and have been used in various bonding and fastening applications. They provide a flexible bond and are used in a wide range of applications including adhering labels, decals, and bonding automotive trim parts and name plates to various substrates. However, they show substantially lower strength characteristics compared to a structural adhesive like cured epoxy or cyanoacrylates.

There is a need in the industry to find an adhesive composition which exhibits pressure-sensitive adhesive characteristics useful during assembly and which may then be converted by subsequent treatment to a structural adhesive. It is preferred that the subsequent treatment be by thermal means and could even be cured by electromagnetic induction if desired.

In use, such adhesive could be provided between two release layers or as a single tape with differential release, preferably using a release layer which is differentially releasable from an adhesive layer bonded to a backing which may also be a release surface. The adhesive could then be conveniently applied between the surfaces to be bonded. Sufficiently firm contact or light pressure established between the surfaces will cause sufficient adhesion to temporarily hold the assembly. Thereafter, heat is applied to the composite structure to convert the intermediate adhesive layer into a structural adhesive bond.

Applications for such tapes include "hem-flange" bonding and weld reinforcement in automotive, reinforcing materials for strengthening thin sheet metal and plastics by forming integral structures with the original substrate, and bonding of plastics, precoated metals, SMC, and other advanced materials.

Several attempts were made in the past to come up with a pressure-sensitive adhesive which changes into a structural adhesive after heat activation.

U.S. Pat. No. 3,326,741 (1967) to Olson discloses a tacky pressure-sensitive adhesive which on heat activation achieves a strong permanent bond. The patent discloses a nitrile rubber/epoxy resin blend with curing agent such as dicyandiamide. However, the films did not show good cohesive strength at room temperature which is typically required for a pressure-sensitive adhesive.

U.S. Pat. No. 3,639,500 (1972) to Muny and assigned to Avery Dennison Corporation discloses a curable pressure-sensitive adhesive composition containing a polyepoxide, a carboxylated diene polymer, and an acrylic ester tackifier which on heat activation provides a structural bond.

U.S. Pat. No. 4,404,246 (1983) to Charbonneau et. al discloses an alkoxylated amino formaldehyde condensate in an acrylic pressure-sensitive adhesive composition as a latent crosslinking agent to improve the cohesive strength after heat activation. However, the material behaves as a highly crosslinked pressure-sensitive adhesive after heat activation and cannot be used for structural bonding.

U.S. Pat. No. 4,452,955 to Boeder discloses an adhesive composition consisting of a polymer dissolved in polymerizable monomer, an accelerator such as organic sulfimides and perfluoroalkylsulfonanilides, and an inhibitor. The adhesive shows pressure-sensitive adhesive properties, and after heat activation, the adhesive demonstrates properties similar to a structural adhesive. However, the properties as detailed in the examples do not show properties of true structural type adhesives, especially in lap shears.

U.S. Pat. No. 4,404,345 (1983) to Janssen also discloses a similar adhesive composition consisting of an adhesive base as the first part and an initiator portion as the second part. Bonding methods are also described.

None of the prior art described above teaches or suggests a pressure-sensitive adhesive that can be heat cured to form the strong and permanent bond of a structural adhesive.

SUMMARY OF THE INVENTION

This invention provides an adhesive that has the ease of application of a pressure-sensitive adhesive, yet upon cure by application of heat, forms the strong and permanent bond of a structural adhesive. This adhesive is made up of a core layer of a curable permanent structural adhesive having opposed surfaces with a thin skin of a pressure-sensitive adhesive on one or both surfaces. The core layer is preferably made up of either a partially cured B stage structural adhesive or a blend of curable polymeric material such as an epoxy with an acrylate resin and hardener which upon cure will form a structural adhesive. It is this core layer that forms the strong and permanent bond after final cure. The preferred embodiment also includes an impact improving elastomer to make the bond more impact resistant. In the most preferred embodiment, an impact improving resin, preferably an elastomer is included in the core layer. Fillers, fibers and the like can also be used to improve impact resistance.

The skin of pressure-sensitive adhesive that is applied to one or both opposing surfaces of the core layer is inherently tacky and provides a temporary bond between the adhesive and a substrate at room temperature. This temporary bond created by the pressure-sensitive adhesive provides a means for holding two substrates together during the cure of the core layer structural adhesive. The core layer structural adhesive is cured by heating the entire assembly made up of the two substrates and the adhesive. Once the heat-cure process has been completed, a strong and permanent bond results. During cure, the skin or skins of pressure-sensitive adhesive are absorbed, presumably blending into the core layer structural adhesive.

Such an adhesive is useful in that it eliminates the need to clamp or otherwise hold substrates to be bonded together during heat cure. The skin or skins of pressure-sensitive adhesive act in place of clamps by providing a temporary bond that lasts long enough to enable the structural adhesive to be cured.

DETAILED DESCRIPTION

This invention provides a novel pressure-sensitive adhesive construction which is normally tacky and forms a pressure-sensitive adhesive bond at room temperature and which on heat activation is supplanted by a structural adhesive bond. This is achieved by distributing on one or both sides of a core layer of structural adhesive a thin skin of a pressure-sensitive adhesive. If the pressure-sensitive adhesive is applied to only one side of the core layer, the other side of the core layer can be prebonded to a backing or face stock. The skin or skins of pressure-sensitive adhesive can be either continuous or discontinuous layers. Various different pressure-sensitive adhesives can be used for the skin layer or layers. For example, either acrylic- or rubber-based pressure-sensitive adhesive may be used. Additionally, the pressure-sensitive adhesive can be either one that is inherently tacky or one that requires addition of a tackifier prior to bonding. The core layer is made up of various different structural adhesives such as a partially cured B stage structural adhesive or a blend of epoxy with an acrylate ester resin and hardener. While the skin or skins of pressure-sensitive adhesive provide the initial tack, these layers are absorbed into the core layer by heat activation. This unique feature provides a pressure-sensitive adhesive with structural adhesive properties after heat activation.

Figure 1:
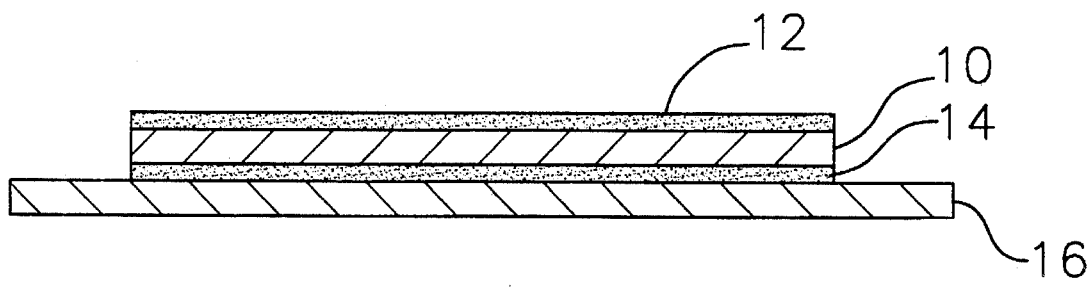
FIG. 1 is a cross section of one embodiment of the invention.
Figure 2:
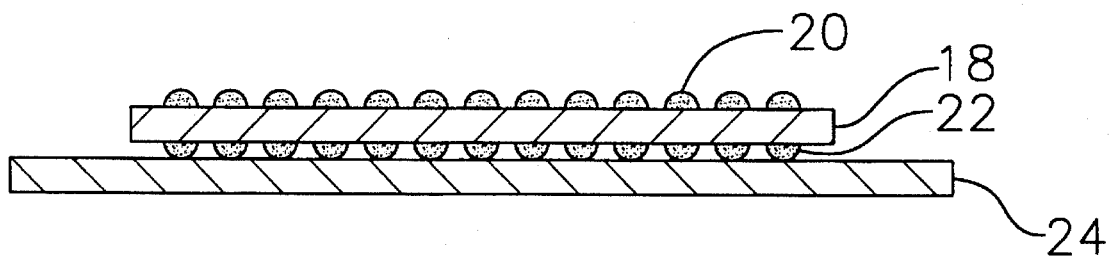
FIG. 2 is a cross section of a second embodiment of the invention.
Figure 3:
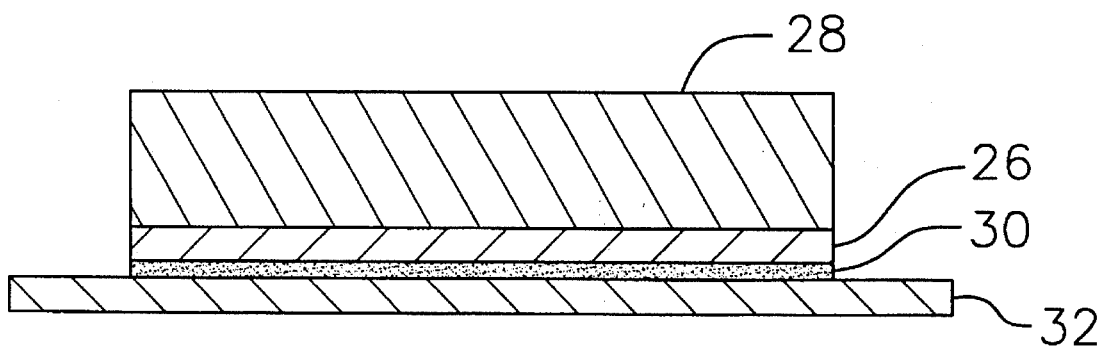
FIG. 3 is a cross section of a third embodiment of the invention.

Referring to the figures, three different embodiments of the invention are illustrated in FIGS. 1–3. In FIG. 1, a cross section of the adhesive is shown in which a core layer of structural adhesive is sandwiched between two continuous skin layers of pressure-sensitive adhesive 12 and 14. The illustration also shows a suitable release liner 16 which protects the pressure-sensitive adhesive and prevents the adhesive from inadvertent bonding prior to use.

FIG. 2 is a cross section of a second embodiment of the invention in which the core layer of structural adhesive 18 is sandwiched between two discontinuous skin layers of pressure-sensitive adhesive 20 and 22. These discontinuous skin layers can take the form of stripes, dots or various other patterns of pressure-sensitive adhesive. The release liner is illustrated as 24.

FIG. 3 is a cross section of a third embodiment of the invention. In this embodiment, the core layer of structural adhesive 26 is prebonded to substrate 28. A skin layer of pressure-sensitive adhesive 30 is found on the opposite side of the core layer. Release liner 32 protects the adhesive and prevents inadvertent bonding prior to use.

This invention is useful for various applications where a strong bond between two substrates or between a backing and a substrate is desirable but difficult to achieve because the substrates are difficult to hold together while the adhesive cures. Applications for such adhesives are numerous. In the automobile manufacturing industry, such adhesives would be useful for "hem-flange" bonding and weld reinforcement by providing a temporary bond which would become permanent during the paint-bake step in manufacturing. The adhesive would also be useful in the aerospace and other industries by providing a means of easily forming integral bonds between plastics, metals and various advanced materials.

The core layer can be comprised of an epoxy resin, a polymer resin and a hardener. Typical examples of epoxy resins include Epon 828, Epon 826, Epon 836 and the like available from Shell Chemical Co., and are characterized by the presence of epoxide functionality. The resins at room temperature could be a liquid of low molecular weight or solid resins which are higher in molecular weight. Blends of several epoxy resins of different structures, molecular weight and epoxy functionality could be used to achieve the desired balance of properties for the core layer.

The polymer resin is preferably an acrylic ester resin like polymethyl methacrylate (PMMA) and PMMA copolymers and the like. For example Acryloid Resin A 21, B 667 etc. manufactured by Rohm and Haas can be used for this application. The acrylic ester resins could be based on methyl methacrylate, butyl acrylate, and isobutyl methacrylate and the like. Other polymers or polymer blends can also be used.

Typical examples of hardeners include boron trifluoride or trichloride amine complexes like $BF_3$: monoethyl amine, blocked amines like HT 9506 (produced by Ciba Geigy), or Dicyandiamide (Dicy) and the like. Mixtures of a blend of hardeners could also be used. Other types of epoxy hardeners could also be used if they provide the desired stability and efficient cure during the heat activation. The hardeners would preferably be incompatible with the resin or inactive at room temperature but if compatible, the hardeners could also be encapsulated in a heat or pressure-sensitive polymer shell.

The core layer can also be comprised of a partially cured B stage epoxy resin. A typical example of such a resin is the FM-73 type manufactured by American Cyanamide. Additional fillers, modifying additives, fibers, and the like could be added to the core layer to improve the strength or modify the properties of the core layer. Due to brittleness of resins without fillers, the preferred embodiment includes fillers. Low density additives like microballoons could be incorporated if desired. Electromagnetic materials such as, particulate magnetizable iron, cobalt, nickel, alloys of nickel and iron, alloys of nickel and chromium, inorganic oxides of iron, inorganic oxides of nickel and the like could be included to enable the structural adhesive curable to be cured by electromagnetic induction heating. The material could also be formulated for UHF, radio frequency, or microwave curing if desired.

The skin layer or layers of pressure-sensitive adhesive can be comprised of an acrylic pressure-sensitive adhesive such as Polytex 7000 which is produced by Avery Chemical, Division of Avery Dennison Corporation. This is a high performance pressure-sensitive adhesive within the scope of the claims of U.S. Pat. No. 4,812,541 to Mallya et al., incorporated herein by reference. This high performance pressure-sensitive adhesive provides unusually high adhesion to high energy surfaces such as aluminum and stainless steel due to synergistic combination of a glycidyl monomer and an N-vinyl lactam monomer.

The skin layer or layers of pressure-sensitive adhesive can also be comprised of an elastomeric pressure-sensitive adhesive. Curable elastomeric pressure-sensitive adhesives are disclosed in U.S. Pat. No. 4,948,825 to Sasaki, incorporated herein by reference. These curable elastomeric pressure-sensitive adhesives incorporate organic additives to reduce the energy requirements of a pressure-sensitive adhesive that is cured by actinic radiation.

Various other pressure-sensitive adhesives with different properties can be used for the skin layer as well. A permanent pressure-sensitive adhesive can be used, or if repositioning of the substrates to be bonded is desired prior to final cure, a removable pressure-sensitive adhesive can be used. A repositionable pressure-sensitive adhesive is disclosed in U.S. patent application Ser. No. 741,556 to Mallya et al., now abandoned incorporated herein by reference. This application discloses a repositionable pressure-sensitive adhesive that has adhesive characteristics that vary depending on the application pressure. Furthermore, an inherently tacky pressure-sensitive adhesive can be used, or one that requires the addition of a tackifier prior to bonding.

The impact resistance of the pressure-sensitive structural adhesives disclosed in this specification tends to be low. Impact resistance can be improved by the addition of fillers, modifying additives, fibers or the like. These additives are included in the core layer at levels which provide satisfactory impact resistance and reduced brittleness. Since the skin layer of pressure-sensitive adhesive is absorbed into the core layer during cure, the impact modifier can also be added to the pressure-sensitive adhesive as well as the core layer with equivalent results.

While numerous options are available for the skin layers of pressure-sensitive adhesive that make up this pressure-sensitive structural adhesive, the preferred embodiment uses an acrylic pressure-sensitive adhesive that includes a compatible impact-improving resin, preferably an elastomer.

Various release layers are available which may be applied to the adhesive and are useful in protecting the skin layer or layers of pressure-sensitive adhesive from inadvertently bonding prior to use. Suitable release layers are described in some detail in Chapter 23 of the *Handbook of Pressure Sensitive Adhesive Technology*, 2d Ed., edited by Donatas Satus, and incorporated herein by reference. If skin layers of pressure-sensitive adhesive are used on both sides of the core layer of structural adhesive, then release layers can be applied to both sides of the adhesive. These two release layers would preferably be differentially releasable from the adhesive layer to provide additional convenience in application.

Following are examples which more specifically illustrate the invention. In these examples, the 180° peel adhesion is measured as described in PSTC-1, using 2 mil Mylar as face material and stainless steel substrate. The shear adhesion failure temperature (SAFT) is measured by applying the adhesive to a 2 mil aluminum strip and bonding it to stainless steel with a 2.54 cm² overlap. A 1.0 kg load is attached on one end and the temperature is raised at 0.5° C. per minute until the adhesive fails in shear. The temperature at which the adhesive fails is regarded as the SAFT temperature.

Lap shear is determined by applying the adhesive film to a 0.64 to 1.01 mm thick by 2.54 cm strip of steel that is subsequently bonded to a second strip of steel with the same dimensions. A 1.27 cm overlap is maintained between the steel strips for a total bond area of 1.27 cm by 2.54 cm. A 0.5 mm bond thickness for the structural adhesive is maintained by using 0.5 mm spacer bars placed between the steel strips. An external force is applied to pull the strips apart, and the lap shear is measured as the force at which the bond breaks divided by the bond area. Lap shear is reported in pressure units as psi or MPa. Since the bonded steel strips are offset in nature, the measured bond failure is not purely due to shear stress, but includes cleavage and peel stresses as well. This determination of lap shear follows general engineering standards of the automobile industry.

EXAMPLE 1

A core layer was prepared by mixing 48 parts of Acryloid B66T (51% in Toluene) a Methyl Methacrylate dissolved in Tolune, 16 part of Epon 828 and 8 parts of HT9506. The mixture was coated onto a Teflon FEP film to give a coat weight of 75 g/m². This was first dried for 15–20 minutes at room temperature and then at 70° C. for 15 minutes.

A skin layer of an acrylic pressure-sensitive adhesive was prepared by solvent coating 15 g/m² of Polytex 7000 onto a Teflon (flourinated ethylenepropylene copolymer) film and drying at 70° C. for 15 minutes. The skin layer was then laminated on both sides of the core layer to prepare a sandwich construction.

This film gave a 180° peel adhesion of 526 N/m, shear adhesion of 441 minutes, shear adhesion failure temperature of 140° F. and lap shear of 189 psi (1.3 MPa). After baking this film at 200° C. for 30 minutes, it gave a lap shear of 1000 psi++(6.89 MPa).

EXAMPLE 2

A "B" stage epoxy resin (FM-73) from American Cyanamide was used as the middle core layer.

A skin layer of pressure-sensitive adhesive (Polytex 7000) was laminated to each side of the core layer at 15 g/m² coat weight.

This film gave a lap shear of 37 psi. After baking at 200° C., this film gave a lap shear of 1000+psi.

EXAMPLE 3

A core layer was prepared by mixing 66 parts of Acryloid A21 (30% in Toluene) a methyl methacrylate polymer, 39 parts of Epon 828 and 12 parts of HT9506. The mixture was coated onto a Teflon FEP film to give a coat weight of 75 g/m². This was first dried for 15–20 minutes at room temperature and then at 70° C. for 15 minutes.

A skin layer of an acrylic pressure-sensitive adhesive was prepared by coating 15 g/m² of Polytex 7000 onto a Teflon FEP film and drying at 70° C. for 15 minutes. The skin layer was then laminated on both sides of the core layer to prepare a sandwich construction.

This film gave a 180° peel adhesion of 526 N/m, shear adhesion of 2000 minutes+, shear adhesion failure temperature of 183° F. and lap shear of 174 psi (1.23 MPa). After baking at 200° C. for 30 minutes, this film gave a lap shear of 1000 psi+ (6.89 MPa) typical of a structural adhesive.

EXAMPLE 4

A middle core layer was prepared by blending 227 parts of Araldite GY 6010, an unmodified liquid epoxy resin (manufactured by CIBA GEIGY), and 95 parts of Acryloid B66 a methyl/butyl methacrylate copolymer, in a Brabender Plasticorder using the roller mixer at 140° C. until the mixture was homogenous. The temperature of the mix was reduced to 45°–50° C. by cooling and 32 parts of Dicyanex 200-X, a solid curing agent, (manufactured by American Cyanamide) was mixed into this mixture. This blend was then extruded as a sheet, 3 to 6 mil in thickness using the Brabender extruder. The die temperature was maintained at about 50° to 60° C. Two thin (15 g/m²) acrylic pressure-sensitive adhesive layers were laminated on either side of this core.

This film laminated to 2 mil Mylar showed a peel adhesion of 1400 N/m on stainless steel substrate, room temperature shear of 255 minutes and SAFT of 45° C. The sample showed a lap shear of 105 psi (0.72 MPa). The lap shear of the sample after baking at 200° C. for 30 minutes increased to 2800 psi (19.29 MPa).

EXAMPLE 5

A core layer was prepared by blending 300 parts of Acryloid A-21, a solid a methyl methacrylate polymer resin, heated to 175° C. with 400 parts of Araldite GY-6010, an unmodified liquid epoxy resin, until homogenous, raising the temperature to 215° C. and adding 44 parts of glass fiber (965-57) and mixing for about 30 minutes. The mixture was cooled to 90° C. and 50 parts Hycar 1300×13, an acrylic copolymer, were added then the blend was mixed for an additional 30 minutes. Finally 70 parts of Dicyanex 200-X, a solid curing agent, were added and mixed for another 30 minutes. The mixture was coated onto a Teflon FEP film to give a coat weight of 550 g/m².

Two skin layers of Polytex 7000 adhesive film were laminated to either side of the core layer to give a coat weight of 17 g/m². This sample gave a 180° peel adhesion of 1020 N/m. The lap shear after baking at 196° C. for 30 minutes was 1970 psi.

EXAMPLE 6

A core layer was prepared as in Example 5 to a coat weight of 625 g/m². Skin layers of I-406 were laminated to either side of the core layer to give a coat weight of 10.6 g/m.

The film gave a 180° peel adhesion of 875 N/m. After baking at 196° C. for 30 minutes, the sample gave a lap shear of 1400 psi.

What is claimed is:

1. A pressure-sensitive structural adhesive construction comprising:
   (a) a core layer of a curable structural adhesive which is a partially cured B-stage epoxy resin or a blend of an epoxy resin, an acrylic ester resin and a hardener, said core layer having opposed surfaces and having applied on at least one of said opposed surface prior to cure of the core layer;
   (b) a continuous or discontinuous layer of an inherently tacky pressure-sensitive adhesive, compositionally different from the core;
   said pressure-sensitive adhesive layer providing an initial adhesion to a substrate to be bonded by cure of the core layer and being absorbed by the core layer when a permanent thermoset bond to such substrate is formed by thermal cure of the core layer.

2. The pressure-sensitive structural adhesive construction as claimed in claim 1 in which there is present an impact improving resin which is compatible with and included in the core layer, the pressure-sensitive adhesive layer or both the core layer and pressure sensitive adhesive layer.

3. The pressure-sensitive structural adhesive construction as claimed in claim 2 in which the compatible impact improving resin is an elastomer.

4. The pressure-sensitive structural adhesive construction as claimed in claim 3 in which the pressure-sensitive adhesive is on both surfaces of the core layer and the pressure-sensitive adhesive layers bond two substrates together until the core layer of curable structural adhesive is cured by application of heat.

5. The pressure-sensitive structural adhesive construction as claimed in claim 3 in which electromagnetic materials are blended into the curable core layer and the core layer is thermally cured by electromagnetic induction heating.

6. A pressure-sensitive structural adhesive construction as claimed in claim 5 in which the impact modifying resin is an elastomer.

7. A pressure-sensitive structural adhesive construction as claimed in claim 3 in which the impact modifying resin is an elastomer.

8. The pressure-sensitive structural adhesive construction as claimed in claim 2 in which the pressure-sensitive adhesive is on both surfaces of the core layer and the pressure-sensitive adhesive layers bond two substrates together until the core layer is cured by application of heat.

9. A pressure-sensitive structural adhesive construction as claimed in claim 8 in which the tacky pressure-sensitive adhesive is selected from the group consisting of an acrylic pressure-sensitive adhesive and a curable elastomeric pressure-sensitive adhesive.

10. The pressure-sensitive structural adhesive construction as claimed in claim 2 in which electromagnetic materials are blended into the curable core layer and the core layer is thermally cured by electromagnetic induction heating.

11. A pressure-sensitive structural adhesive construction as claimed in claim 2 in which the tacky pressure-sensitive adhesive is selected from the group consisting of an acrylic pressure-sensitive adhesive and a curable elastomeric pressure-sensitive adhesive.

12. The pressure-sensitive structural adhesive construction as claimed in claim 1 in which the pressure-sensitive adhesive is on both surfaces of the core layer and the pressure-sensitive adhesive layers bond two substrates together until the curable core layer is cured by application of heat.

13. A pressure-sensitive structural adhesive construction as claimed in claim 12 in which the tacky pressure-sensitive adhesive is selected from the group consisting of an acrylic pressure-sensitive adhesive and a curable elastomeric pressure-sensitive adhesive.

14. The pressure-sensitive structural adhesive construction as claimed in claim 1 in which electromagnetic materials are blended into the curable core layer and the core layer is thermally cured by electromagnetic induction heating.

15. A pressure-sensitive structural adhesive construction as claimed in claim 1 in which the tacky pressure-sensitive adhesive is selected from the group consisting of an acrylic pressure-sensitive adhesive and a curable elastomeric pressure-sensitive adhesive.

* * * * *

UNITED STATES PATENT AND TRADEMARK OFFICE
CERTIFICATE OF CORRECTION

PATENT NO. : 5,593,759
DATED : January 14, 1997
INVENTOR(S) : Richard R. Vargus; Sebastian S. Plamthottam; John O. Landers It is certified that error appears in the above-indentified patent and that said Letters Patent is hereby corrected as shown below:

Column 1, line 20, change "structural" to -- Structural --.
Column 6, line 11, change "Tolune" to -- Toluene --.
Column 6, line 26, replace "1000 psi++(6.89 MPa)" with
    -- 1000 psi+(6.89 Mpa) --.
Column 7, line 36, change "10.6 g/m" to -- 10.6 g/m$^2$ --.
Column 8, lines 5,6, replace "pressure-sensitive sensitive adhesive" with
    --pressure-sensitive adhesive--

Signed and Sealed this

First Day of September, 1998

Attest:

BRUCE LEHMAN

*Attesting Officer*

*Commissioner of Patents and Trademarks*